United States Patent Office 3,256,271
Patented June 14, 1966

3,256,271
METHOD OF IMPROVING VISCOSITY CHARACTERISTICS OF XANTHOMONAS HYDROPHILIC COLLOIDS AND ESTERS PRODUCED THEREBY
Richard G. Schweiger, San Diego, Calif., assignor to Kelco Company, San Diego, Calif., a corporation of Delaware
No Drawing. Filed June 26, 1963, Ser. No. 290,579
8 Claims. (Cl. 260—234)

This invention relates to improvements in the hydrophilic colloid obtained from *Xanthomonas campestris* and related species and more particularly to a method of improving the viscosity characteristics of the said colloid, and to the product so obtained.

Xanthomonas hydrophilic colloid is a biosynthetic polysaccharide composed of glucose, mannose, and glucuronic acid in the molar ratio 2:1:1, with approximately each ¼ unit of the polymer containing one acetyl group. It disperses or dissolves in water to give solutions of greatly increased viscosity, and in that respect is similar to some other natural gums. However, its properties are not ideal for all applications.

An object of the present invention is to improve the properties of Xanthomonas hydrophilic colloid so that it will exhibit greatly enhanced viscosity in aqueous solutions.

Another object of the invention is to provide a method for obtaining alkylene glycol esters of Xanthomonas hydrophilic colloid, and indeed to provide the reaction product itself.

Other objects of the invention will become apparent as the description thereof proceeds.

As a starting material, I employ Xanthomonas hydrophilic colloid. A Xanthomonas hydrophilic colloid that is particularly suitable for use in accordance with my invention is such a colloid prepared by the bacterium *Xanthomonas campestris*. The said colloid is a polymer containing mannose, glucose and potassium glucuronate. In such a colloid, the potassium portion can be replaced by several other cations without substantial change in the property of the said material for my purpose. The said colloid, which is a high molecular weight, exocellular material, may be prepared by the bacterium *Xanthomonas campestris*, by whole culture fermentation of a medium containing 2–5 percent commerical glucose, organic nitrogen source, dipotassium hydrogen phosphate and appropriate trace elements. The incubation time of the final medium is approximately 96 hours at 30° C. aerobic conditions. In preparing the colloid as aforesaid, it is convenient to use corn steep liquor or distillers' dry solubles as an organic nitrogen source. It is expedient to grow the culture in two intermediate stages prior to the final inoculation in order to encourage vigorous growth of the bacteria. These stages may be carried out in media having a pH of about 7. In a first stage a transfer from an agar slant to a dilute glucose broth may be made and the bacteria cultured for 24 hours under vigorous agitation and aeration at a temperature of about 30° C. The culture so produced may then be used to inoculate a higher glucose (3%) content broth of larger volume in a second intermediate stage. In this stage the reaction may be permitted to continue for 24 hours under the same conditions as the first stage. The culture so acclimated for use with glucose by the aforementioned first and second stages is then added to the final glucose medium. In the aforesaid method of preparing *Xanthomonas campestris* hydrophilic colloid, a loopful of organism from the agar slant is adequate for the first stage comprising 200 milliliters of the said glucose medium. In the second stage the material resulting from the first stage may be used together with 9 times its volume of a 3% glucose medium. In the final stage the material produced in the second stage may be admixed with 19 times its volume of the final medium. A good final medium may contain 3% glucose, 0.5% distillers' dry solubles, 0.5% dipotassium phosphate, 0.1% magnesium sulphate having 7 molecules of water of crystallization and water. The reaction in the final stage may be satisfactorily carried out for 96 hours at 30° C. with vigorous agitation and aeration. The resulting *Xanthomonas campestris* colloidal material which I have found to be suitable for my purpose can be recovered and sterilized by precipitation in methanol of the clarified mixture from the fermentation.

In order to obtain the improved colloid therefrom in accordance with the present invention, I first treat the colloid with a medium to strong acid in aqueous solution that can later be removed by solvent extraction. Suitable acids for this purpose are hydrochloric, sulfuric, phosphoric, sulfamic, trichloroacetic, and the like. The resulting acid-converted colloid is then washed with a water miscible organic solvent in order to remove the acid used in the treating step just described. Suitable solvents are methanol, ethanol, isopropanol, acetone, methyl ethyl ketone, and the like. The colloid does not disperse either in the acid solution used for treating or during the washing step with the solvent, so that conditions are mechanically favorable for treating and washing the colloid with a minimal consumption of both acid and solvent. After the acid treated colloid is washed free of acid by the use of the solvent, it is then reacted with a short chain alkylene oxide, such as ethylene oxide, propylene oxide, butylene oxide, and the like. Specifically, I may use epoxyethane; epoxypropane; 1,2-, or 2,3-epoxybutane; epoxyisobutane, and the like.

In proceeding in accordance with my invention, in accordance with an illustrative embodiment thereof, I first obtain the free acid from Xanthomonas hydrophilic colloid which for example may be the *Xanthomonas campestris* colloid just described. In accordance with this exemplary illustration, the free acid is obtained by making a thick paste in a methanol water mixture, adding a slight excess of hydrochloric acid while mixing thoroughly, extruding this paste into methanol and filtering off the powdery product. The wet polysaccharide acid is then reacted in a pressure reaction apparatus with an alkylene oxide, such as ethylene oxide, or the others already mentioned, after the addition of sufficient of a simple alkali, such as ammonium hydroxide, carbonate, or bicarbonate to neutralize approximately 10% of the carboxyl groups. Instead of the ammonium compounds just recited, their corresponding alkali metal or alkaline earth compounds, such as sodium carbonate, lithium bicarbonate, potassium hydroxide, etc., may be used. The reaction proceeds with the aid of heat and pressure, as will be more particularly described hereinbelow, a suitable reaction temperature being in the range 40°–55° C. The reaction is allowed to proceed until the pH of a test sample is between 4 and 6, and more particularly preferably between 4.5 and 5.0. The reaction is then stopped by removing the pressure, ceasing the addition of the alkylene oxide, and eventually lowering the temperature. In proceeding in this fashion, about 80% to 90% of the available carboxyl groups present in the Xanthomonas hydrophilic colloid become esterified. If the pH is considerably higher when the reaction is stopped, then the product is partially insoluble in water. If the partial preneutralization described hereinabove is omitted, then the reaction is very slow and incomplete.

The reaction is performed in 100% methanol or methanol diluted with water to in general not less than about 80% methanol. If more water than this is present, the product tends to become pasty and the isolation thereof becomes more difficult. When straight methanol is used, it is quite practicable to use as much as 50% solids in the reaction mixture, and the reaction product obtained is a moist powder which can be isolated and dried directly with a minimum of difficulty.

A surprising and completely unexpected result obtained when proceeding in accordance with my invention is that when an aqueous solution is made up using the treated material, the viscosity will be many times that of the starting material, viz. the Xanthomonas hydrophilic colloid itself.

In practice, for a given concentration by weight in water, the treated material may have four or five or six times the viscosity of the starting material. Also quite surprising in view of the very substantial viscosity increase just described are the flow characteristics. An aqueous solution of the starting material, that is, the untreated Xanthomonas hydrophilic colloid, tends to become very stringy at high concentrations of sugar. Quite to the contrary, the products obtained in accordance with my invention have a "short" flow reminiscent of that of gelatinized starch in water. This type of flow behavior is maintained even at high concentrations of sugar, which makes the product especially desirable for food applications. Even where sugar is not involved in the formulations, my improved product permits the use of much less colloid in order to obtain a given viscosity.

While *Xanthomonas campestris* is the bacterium of choice, and the colloid of which I have found to be best, neverthless related species of Xanthomonas also elaborate a hydrophilic colloid which may be utilized with almost equal success in many instances. Such other species are *Xanthomonas begoniae, X. malvacearum, X. carotae, X. incanae, X. phaseoli, X. vesicatoria, X. papavericola, X. translucens, X. vasculorum, X. hederae,* and others. These are all included in the scope of my invention.

Some further examples will now be given of my invention:

*Example I*

300 g. of *Xanthomonas campestris* colloid obtained as described hereinabove was mixed thoroughly with 300 cc. of methanol and 400 cc. of water. 83 cc. of concentrated hydrogen chloride diluted to 200 cc. with water was added while mixing was continued. The heavy paste was extruded into methanol, filtered off, extruded a second time into methanol, broken up in a Waring Blender in the presence of methanol and then removed by filtration. An aliquot of this polysaccharide acid was dried and titrated with 0.1 N sodium hydroxide using phenolphthalein as the indicator: found was 1.52 meq./1 g.

The product after filtering it off weighed 679 g. This moist powder was placed in a pressure reaction apparatus together with 2.9 cc. of concentrated ammonium hydroxide in 50 cc. of methanol. It was stirred and heated to 46–48° while 250 cc. of propylene oxide was added during a period of about 10 hr. The pH increased gradually to 7.8. The end product after drying and milling swelled in water but was insoluble.

*Example II*

Another portion of 330 g. of Xanthomonas hydrophilic colloid was transformed into the free acid form; after washing it weighed 667 g. This product, after the addition of 2.9 cc. of concentrated ammonium hydroxide in 50 cc. of methanol, was reacted at 46-51° with 240 cc. of propylene oxide which was added slowly during a period of about 3 hrs. After a total reaction time of about 7 hrs. the product (moist powder) was removed, dried and milled. The viscosity of a 1% aqueous solution was 5100 cps.

*Example III*

330 g. of Xanthomonas hydrophilic colloid, transformed into the free acid form as described above, was reacted at 45–50° with 280 cc. of propylene oxide which was added slowly over a period of about 6 hrs. The total reaction time was about 8 hrs. The product was left in the reactor overnight at room temperature. The initial pH was 2.5, the pH of the end product 4.8. The material was removed, dried and milled; viscosity (1%) 4100 cps., slightly grainy.

The pH during the reactions increased from about 2.5 to 4.5–6.0 which indicates esterification of nearly all free carboxyl groups. Since about 15–20% of the carboxyl groups available were pre-neutralized with ammonium hydroxide the degree of esterification in all experiments is about 70–80%, i.e., 70–80% of all carboxyl groups are esterified.

An example of the use of my colloid obtained in accordance with the invention in a cosmetic lotion will now be given. A suspension was made of 10 grams calamine, one gram camphor, ½ gram phenol, ½ gram thymol, 1 gram of the product obtained in accordance with Example I hereinabove, and the balnce water. When a smooth suspension of these ingredients was obtained by the use of a laboratory stirrer, a stable lotion was obtained which had excellent shelf properties, and which when applied to the skin had very good mechanical properties, having a particularly smooth spreading characteristic and drying out to a film which held the calamine and other ingredients in place on the skin without any unpleasant stickiness.

It will be appreciated that while I have described my invention in terms of specific ingredients, reaction conditions and the like, numerous variations may be made in the details thereof without departing from the spirit and scope of the invention as delineated in the claims which follow.

I claim:

1. The process of treating Xanthomonas hydrophilic colloid which comprises the steps of: treating said colloid with an aqueous solution of a water soluble acid so as to produce the free acid of said colloid; washing the so-treated colloid with a water miscible solvent so as to remove said acid; thereafter treating the washed colloid with a quantity of an alkali sufficient to neutralize a portion of the carboxyl groups; and thereafter treating the thus partially neutralized colloid with a lower alkylene oxide until a majority of the available carboxyl groups of said colloid are esterified.

2. The process in accordance with claim 1 in which said water soluble acid is chosen from the class consisting of hydrochloric, sulfuric, phosphoric, sulfamic, and trichloroacetic.

3. The process in accordance with claim 1 in which said water miscible solvent is chosen from the class consisting of methanol, ethanol, propanol, acetone, and methyl ethyl ketone.

4. The process in accordance with claim 1 wherein said alkali is chosen from the group consisting of ammonium hydroxide, ammonium carbonate, ammonium bicarbonate, sodium hydroxide, sodium carbonate, sodium bicarbonate, lithium hydroxide, lithium carbonate, lithium bicarbonate, potassium hydroxide, potassium carbonate, and potassium bicarbonate, and mixtures thereof.

5. The process in accordance with claim 1 in which the said portion of the carboxyl groups neutralized is approximately 10%.

6. The process in accordance with claim 1 wherein said lower alkylene oxide is chosen from the class consisting of epoxyethane; epoxypropane; 1,2-, or 2,3-epoxybutane; and epoxyisobutane.

7. The process in accordance with claim 1 wherein said majority of the available carboxyl groups of esterified colloid is about 80% to 90%.

8. The product obtainable in accordance with the process of claim 1.

References Cited by the Examiner
UNITED STATES PATENTS

| | | | |
|---|---|---|---|
| 2,831,855 | 4/1958 | Martin | 260—209 |
| 3,000,790 | 9/1961 | Jeanes et al. | 260—209 |
| 3,020,206 | 2/1962 | Patton et al. | 260—209 |
| 3,102,114 | 8/1963 | Komori et al. | 260—234 |

LEWIS GOTTS, *Primary Examiner.*

IRVING MARCUS, *Examiner.*

NORMA S. MILESTONE, JOHNNIE R. BROWN,
*Assistant Examiners.*